(12) United States Patent
Crouch et al.

(10) Patent No.: US 7,180,888 B1
(45) Date of Patent: Feb. 20, 2007

(54) QUEUE AS CALLABLE ENTITY IN AN IP TELEPHONY SYSTEM

(75) Inventors: Richard W. Crouch, Gustine, CA (US); Markku Korpi, Starnberg (DE); Robert W. Stephens, Sunnyvale, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/232,749

(22) Filed: Jan. 15, 1999

(51) Int. Cl.
*H04L 12/16* (2006.01)

(52) U.S. Cl. ............... 370/352; 370/270; 379/207; 379/266

(58) Field of Classification Search ........... 370/352, 370/353, 354, 355, 356, 412, 413, 414, 415, 370/416; 379/266.01, 266.02, 266.03, 266.04, 379/266.06
See application file for complete search history.

(56) References Cited

FOREIGN PATENT DOCUMENTS

| EP | 0 866 407 A1 | 9/1998 |
|---|---|---|
| WO | WO 98 17048 | 4/1998 |
| WO | WO 98 44714 A | 10/1998 |

OTHER PUBLICATIONS

Blank M: "H.323 Gatekeepers: Essential Software for IP Telephony and Multimedica Conferencing", CTI Developer, 'Online! Feb. 1998 pp. 1-6, XP0021962100.

*Primary Examiner*—Chi Pham
*Assistant Examiner*—Phuc Tran

(57) ABSTRACT

A queue server is established in a packet telephony environment, wherein the queue server is defined as a callable entity, separate from the H.323 workstation for which it is being used. The queue may be used with any piece of H.323 software without modification to the software. All that need be done is the configuration that is typically accomplished when H.323 software is installed on the workstation. For example, the queue may be identified as a callable entity to receive call forwarding from the busy device or endpoint. The H.323 software of the endpoint needs to be able to handle only one call at a time, thereby reducing memory requirements for the equipment.

17 Claims, 8 Drawing Sheets

QUEUE AS CALLABLE ENTITY IN AN IP TELEPHONY SYSTEM

BACKGROUND OF THE INVENTION

The present invention relates to telecommunications systems, and in particular, to an improved IP telephony system.

In communication systems, it is possible for more telephone calls to arrive for a destination than can be processed by the called party. To prevent such calls from being lost, central switching systems such as private branch exchanges (PBXs) implement queues that hold the calls until they can be processed by the called party.

In an Internet Protocol (IP) telephony environment based upon protocols such as ITU-T H.323, no such central switch exists. Thus, to accomplish a queue in such a system, the destination workstation is required to accept and control all of the queued calls. Such workstations, however, require significant memory processor and network resources. In many cases, such resources are not available in common workstations that need to receive the queued calls.

In addition, IP-based call center applications have been designed with central servers responsible for accepting the calls. In such cases, the server then uses third-party call control to transfer the call to a specially equipped H.323 workstation. Typically, however, such call center applications are very expensive and in most cases require special software for the third-party call control in the destination H.323 workstation.

Accordingly, there is a need for an improved method for queuing calls in an IP or packet-based telephony environment.

SUMMARY OF THE INVENTION

These and other drawbacks in the prior art are overcome in large part by a queuing system according to the present invention. In particular, a queue server is established in a packet telephony environment, wherein the queue server is defined as a callable entity, separate from the H.323 workstation for which it is being used. The queue may be used with any piece of H.323 software without modification to the software. All that need be done is the configuration that is typically performed when H.323 software is installed on the workstation. For example, the queue may be identified as a callable entity to receive call forwarding from the busy device or endpoint. The H.323 software of the endpoint needs to be able to handle only one call at a time, thereby reducing memory requirements for the endpoint equipment.

A callable queue according to the present invention may be implemented once and used in a wide range of applications. The queue for the H.323 endpoint can be set up to run on a network server that typically would have the resources needed to handle the queue even under worst case scenarios. In addition, the queue can be used in a workgroup environment by installing it in one of the IP telephones of the group. The telephone may be assigned to a workgroup assistant. The other members of the group may then use, for example, Windows PCs or basic IP telephones in their workplace.

A better understanding of the invention is obtained when the following detailed description is considered in conjunction with the following drawings.

DETAILED DESCRIPTION OF THE INVENTION

Figure 1A:
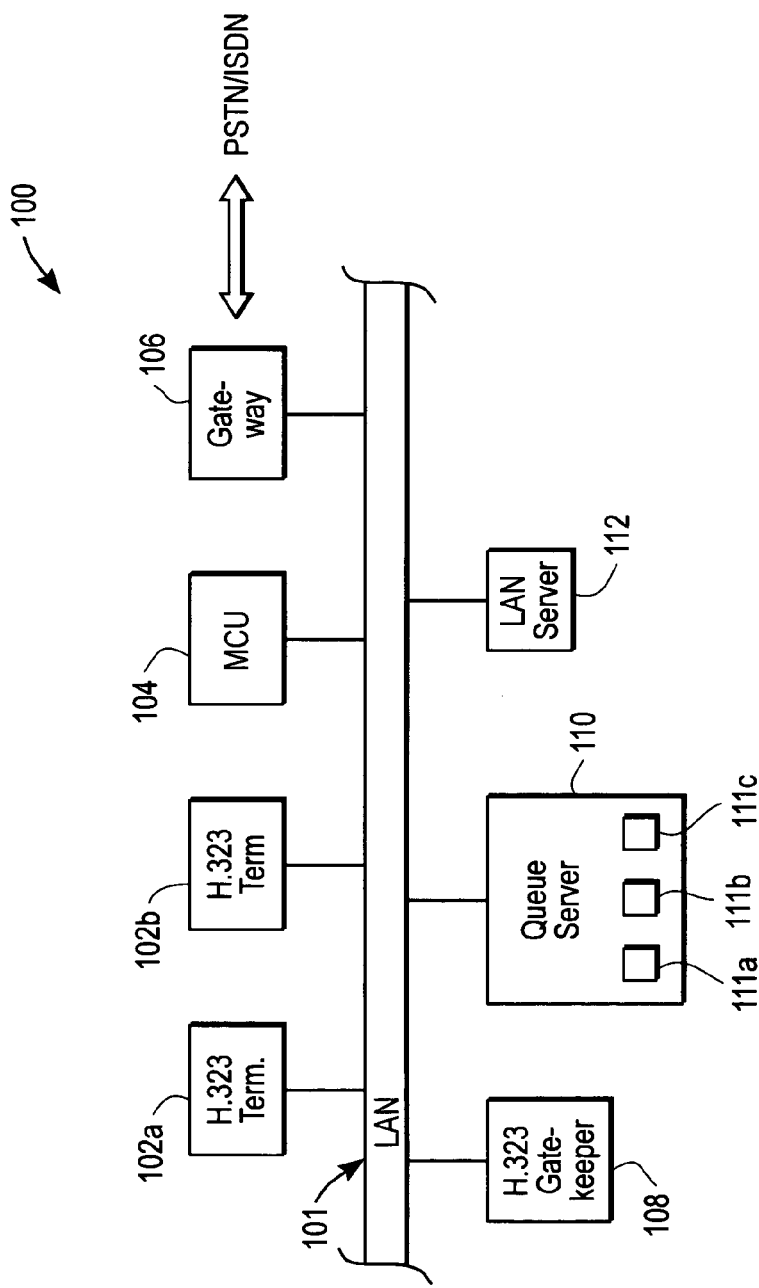
FIG. 1A is a diagram illustrating a telecommunications system according to an embodiment of the invention.

Turning now to the drawings, and with particular attention to FIG. 1A, a diagram 100 illustrating a telecommunications system according to an embodiment of the present invention is shown. In particular, the telecommunications system 100 includes a local area network (LAN) or packet network 101. Coupled to the LAN 101 are a variety of H.323 terminals 102a, 102b, a multi-point control unit (MCU) 104, an H.323 gateway 106, an H.323 gatekeeper 108, a LAN server 112, and a queue server 110 which may include a plurality of queues 111a–111c. In addition, a plurality of other devices such as personal computers (not shown) may be coupled to the LAN 101. The H.323 terminals 102a, 102b are in compliance with the H.323 standard (e.g., the H.323 standard in existence as of the filing date of this application). Thus, the H.323 terminals 102a, 102b support H.245 for negotiation of channel usage, Q.931 for call signalling and call setup, registration admission status (RAS) and RTP/RTCP for sequencing audio and video packets. The H.323 terminals 102a, 102b may further implement video codecs, T.120 data conferencing protocols and MCU capabilities. Further details concerning the H.323 Specification may be obtained from the International Telecommunications Union; the Specification is hereby incorporated by reference in its entirety as if fully set forth herein.

Figure 1B:
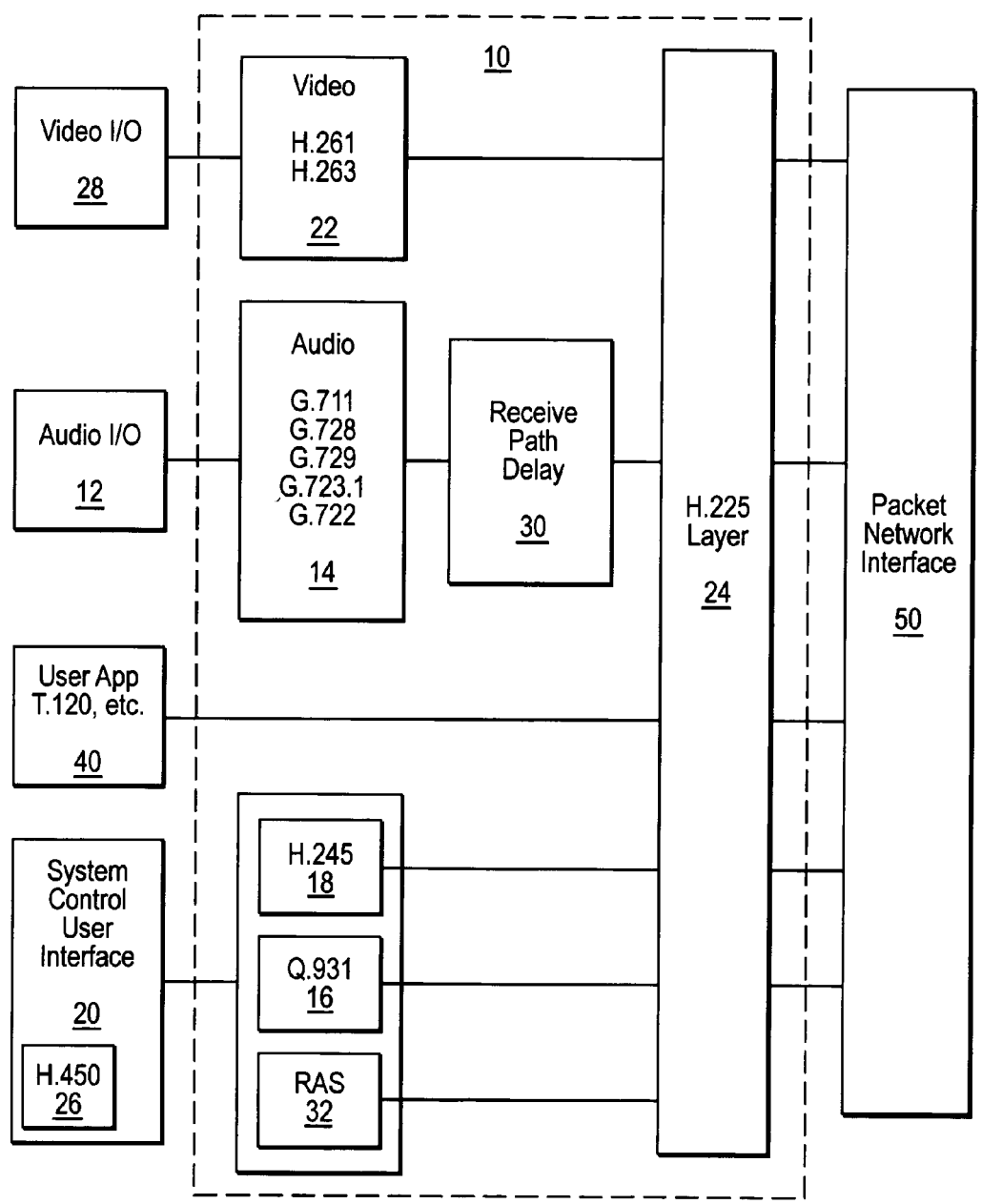
FIG. 1B is a diagram of an exemplary H.323 interface according to an embodiment of the invention.

In accordance with a specific embodiment, FIG. 1B illustrates a logical diagram of an H.323 interface to LAN 101. The interface includes a known network terminal/device 10 utilizing the ITU-T H.323 standard protocol, and a packet network interface 50 that is coupled to network terminal 10. Network interface 50 couples the H.323 device to LAN 101. H.323 terminals/devices and equipment carry real-time voice, video and/or data. It should be noted that H.323 is an umbrella recommendation that sets standards for multimedia communications, including telephony-over-LAN communications. The network can include packet-switched Transmission Control Protocol/Internet Protocol (TCP/IP) and Internet Packet Exchange (IPX) over Ethernet, Fast Ethernet and Token Ring networks.

The network terminal 10 is coupled to a video input/output (I/O) interface 28, an audio I/O interface 12, an user application interface 40, and a system control user interface (SCUI) 20. Network terminal 10 also includes an H.225 layer 24, a video coder/decoder (codec) 22, an audio codec 14, receive path delay logic 30, H.245 protocol functionality 18, Q.931 protocol functionality 16, and RAS protocol functionality 32.

As seen in FIG. 1B, video I/O interface 28 which may be part of the standard H.323 device, connects to the video coder/decoder (codec) 22 such as an H.261 codec for encoding and decoding video signals. Coupled between video I/O interface 28 and H.225 layer 24, video codec 22 translates encoded video signals to H.225 protocol signals. Although the H.261 codec can be the video codec used for an H.323 terminal, other video codecs, such as H.263 codecs and others, may also be used for encoding and decoding video.

Audio I/O interface 12, which may be part of a standard H.323 terminal, connects to the audio codec 14, such as a G.711 codec, for encoding and decoding audio signals. Coupled to audio I/O interface 12, audio codec 14 is coupled to H.225 layer 24 via receive path delay logic 30 and translates audio signals to H.225 protocol signals. Although the G.711 codec is the mandatory audio codec for an H.323 terminal, other audio codecs, such as G.728, G.729, G.723.1, G.722 etc. may also be used for encoding and decoding speech. G.723.1 is a preferred codec because of its reasonably low bit rate, which enables preservation of link bandwidth, particularly in slower speed network connections.

SCUI 20 provides signaling and flow control for proper operation of the H.323 terminal. In particular, all non-audio and non-video control signaling is handled by SCUI 20. Coupled to SCUI 20 are H.245 layer 18, Q.931 layer 16 and RAS layer 32, which each couple to H.225 layer 24. Thus, SCUI 20 interfaces to the H.245 standard which is the media control protocol that allows capability exchange, channel negotiation, switching of media modes and other miscellaneous commands and indications for multimedia communications. SCUI 20 also interfaces to the Q.931 protocol which defines the setup, teardown, and control of H.323 communication sessions. SCUI 20 further interfaces to the Registration, Admission, Status (RAS) protocol that defines how H.323 entities can access H.323 gatekeepers to perform among other things address translation, thereby allowing H.323 endpoints to locate other H.323 endpoints via an H.323 gatekeeper. The H.225 standard layer 24, which is derived from the Q.931 standard, is the protocol for establishing connection between two or more H.323 terminals and also formats the transmitted video, audio, data and control streams into messages for output to the network interface 50 (e.g., transport over IP network 101). The H.225 layer 24 also retrieves the received video, audio, data and control streams from messages that have been input from network interface 50. User application interface 40, which may be a T.120 protocol interface as well as other types of protocol interfaces, also couples to H.225 layer 24.

Thus, an H.323 network may be configured to include several different devices. For example, the network may include a terminal for enabling users connected to a LAN to speak, a terminal for enabling a caller resident on the LAN to call a second user through the public switched network and/or a terminal for enabling the adapter to communicate through a wireless trunk, using a wireless telephone. The device may also implement supplementary services according to the H.450 protocol specification 26. As will be explained in greater detail below, the SCUI 20 is configured, upon initialization, to identify one or more queues as callable entities (i.e., as entities capable of receiving calls from the particular device).

The H.323 gateway 106 (FIG. 1A) generally provides a translation function between H.323 conferencing endpoints and other terminal types and performs call setup and clearing on both the LAN side and switched circuit network side. The H.323 gatekeeper 108 performs address translation from LAN aliases for terminals and gateways to IP or IPX addresses (as defined in the RAS specification) as well as bandwidth management (also specified within the RAS specification). The H.323 gatekeeper 108 may further be used for call routing.

Finally, a queue server 110 may be provided in accordance with the present invention. As seen in FIG. 1A, the queue server 110 includes a plurality of queues 111a–111c, each of which is assigned a queue alias and may receive calls from the other H.323 devices as will be explained in greater detail below. That is, each queue is an H.323 callable endpoint with one or more registered aliases. Each queue is defined with a list of one or more destination aliases it is serving. It is noted that, while illustrated as a dedicated server, the callable queues may be implemented in a network server or an IP telephone; thus, FIG. 1A is exemplary only.

According to an embodiment of the invention, queuing is implemented as a separate callable function on a server. Thus, it is possible to simplify functions like the hunt group proxy that may need to operate on multiple calls. The hunt group proxy can be implemented to only deal with a single call at a time by installing it in front of the hunt group proxy. If the customer wants queuing for hunt groups, all that needs to be done is to configure the queue and set the forwarding as needed.

Figure 2:
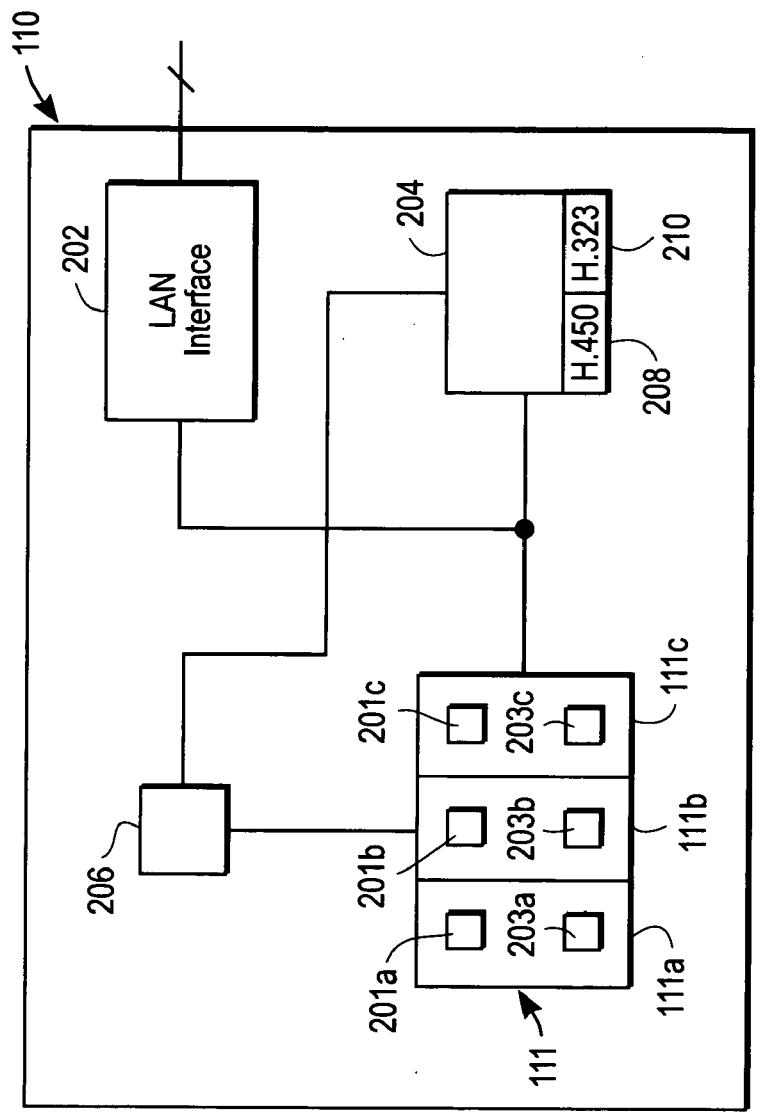
FIG. 2 is a diagram of an exemplary queue server according to an embodiment of the invention.

In particular, turning now to FIG. 2, a block diagram of an exemplary queue server 110 is shown in greater detail. The queue server 110 includes a known LAN interface 202 coupled to the LAN 101 (FIG. 1A) and coupled to receive communications over the LAN 101. A control unit 204 is further provided which includes H.450 and H.323 compliant controls 208, 210. Further, a plurality of queues (111a–111c) are provided, each of which defines a callable entity 201 and a callable alias 203. Further, in one embodiment, a timer 206 may be provided coupled to the queues 111 and the control unit 204. (Generally, the queue server 110 is H.323 compliant, as shown in FIG. 1B; FIG. 2 is simplified for clarity).

The queues 111 may be embodied as predefined memory segments and are established and associated by the control unit 204 with the appropriate H.323 terminals 102 (FIG. 1A) upon system initialization or configuration. A queue server 110, according to the present invention, includes one or more callable queues 111 and may be configured to be used for any of the traditional PBX applications which require queuing. These include, for example, but are not limited to, hunt groups, attendant consoles, outgoing trunks, interactive voice responsive (IVR) and voice mail. All that is required of an H.323 terminal that uses queuing is for it to have a "forward on busy" function activated to the queue server, and, more particularly, to the assigned queue.

Each queue server 110 maintains a set of queues. For each defined queue, the queue server registers the queue aliases in a known manner with the gatekeeper 103 at initialization or when a new queue is created; the queue server de-registers the queue aliases when a queue is deleted.

As noted above, a queue is configured with one or more callable aliases. The queue also has configured one or more callable entities designed to be the destination of calls received by the queue. Calls received by the queue are acknowledged at the signaling level and, if so configured, by an audible tone to the caller and placed in the queue. When there are calls in the queue, the queue controller 204 functions in one of two modes: if the endpoint served by the queue does not support (H.450) supplementary services to report its state, the queue server 110 will enter into a "transfer call-back" mode; or if the endpoint served by the queue does support supplementary services to report its state, the queue server 110 will enter into a "query" mode. In the transfer call-back mode, the queue server 110 will wait a predetermined delay period and then use H.450.2 procedures to transfer the first call in the queue back to the served endpoint. If the served endpoint is still busy, the next re-attempt is made after a short delay. The delay period can be configurable and is typically on the order of a few seconds. However, if the endpoint served by the queue does support H.450 supplementary services or CTI (Computer Telephone Integration) to report its state, then the queue server 110 in the query mode will continue to query the state of the destinations configured to receive calls from the queue. When the queue server 110 (i.e., the controller 204) determines that one of the served destinations is free or not busy, it will remove a call from the queue and transfer the call via the LAN interface 202 to the destination.

For calls received when the queue size is exceeded, it is possible to reject the call or transfer the call to an overflow destination (not shown). Entries in the queue may be ordered first-in-first-out (FIFO) by priority. For a priority queue, the call priority is determined by the alias used for the call. All calls waiting in the queue are either in an active state or an alerting call-waiting state with respect to H.323 signaling and control, depending on the called party's local network treatment of call-waiting. If defined for the queue, music or video-on-hold may be provided for the audio or video channels.

Figure 3:
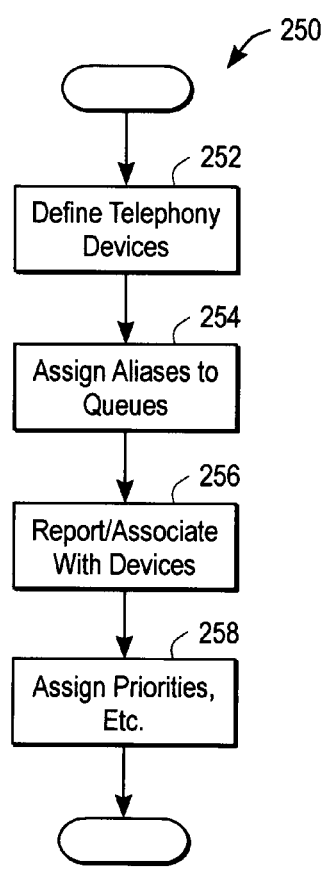
FIG. 3 is a flowchart of system initialization according to an embodiment of the invention.

Turning now to FIG. 3, a flowchart 250 illustrating initialization of the telecommunications system of FIG. 1A is shown. In particular, in a step 252, the telephony devices coupled to the LAN are defined as having network aliases and being callable entities. In a step 254, aliases are also assigned to the queues 111 in the queue server. In a step 256, each of the aliases is either reported to or associated with the appropriate devices or the gatekeeper. Finally, in a step 258 the priorities of the telephony devices are assigned to the queues which have been associated with the devices.

Figure 4:
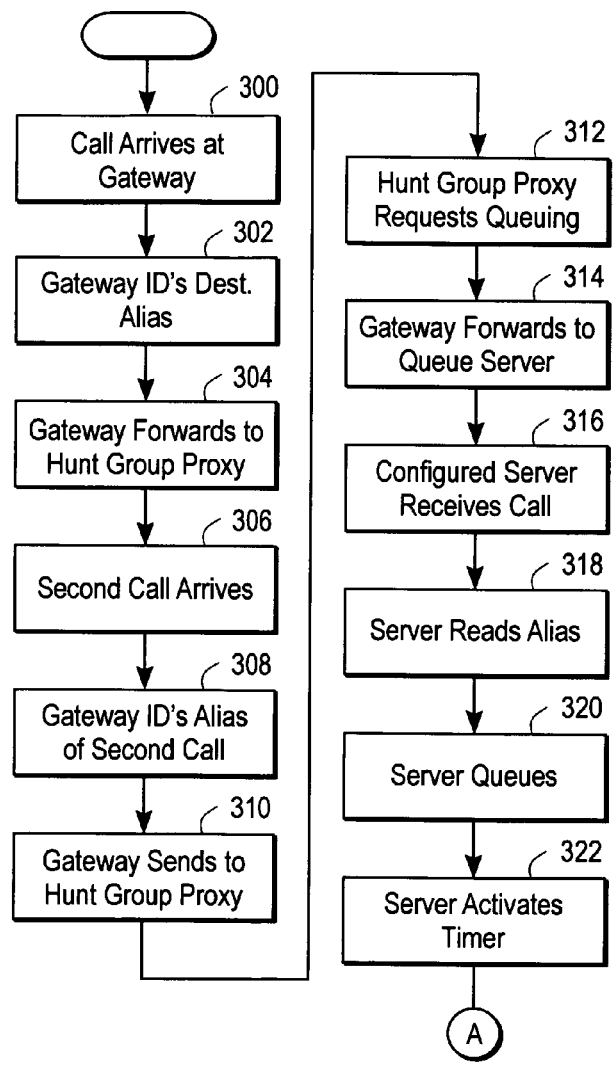
FIG. 4 is a flowchart of a method according to an embodiment of the invention.
Figure 5:
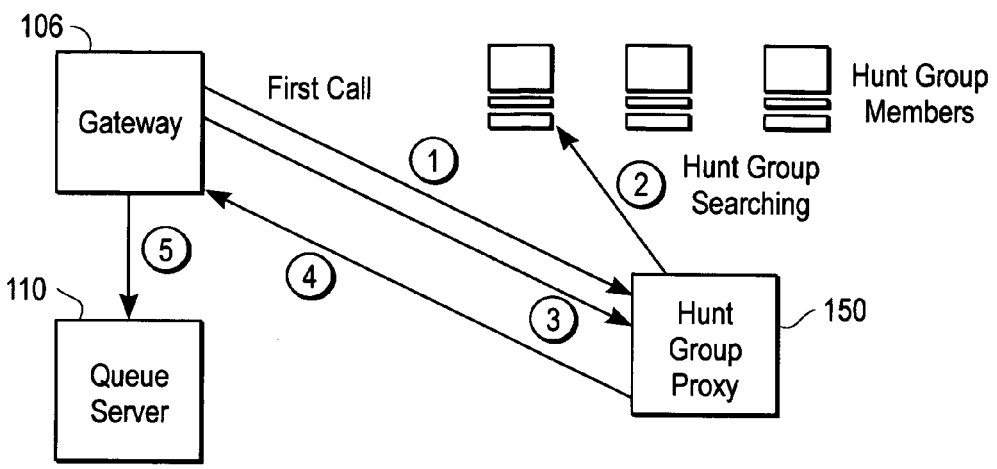
FIG. 5 is a diagram illustrating process flow according to an embodiment of the invention.

Turning now to FIG. 4 and FIG. 5, operation of an embodiment of the invention in a first mode is illustrated. As shown, the example relates to implementation in conjunction with a hunt group. However, any of a variety of telephony applications may implement the callable queue according to the present invention. Thus, the figures are exemplary only. In a step 300, a telephone call arrives at the gateway 106. The gateway 106 reads the destination alias in a step 302, and in a step 304, the gateway 106 forwards (see step 1 in FIG. 5) the first call to the hunt group proxy 150. The hunt group proxy 150 then commences searching among the hunt group members (see step 2 in FIG. 5) for a free member of the hunt group. While the hunt group proxy 150 is busy with the first call, a second call arrives at the gateway 106 in a step 306. Again, in a step 308, the gateway 106 identifies the destination alias. The gateway 106 then sends (see step 3 in FIG. 5) the second call to the hunt group proxy in a step 310. Because it is busy, the hunt group proxy 150 requests (see step 4 in FIG. 5) the gateway 106 to forward the call to the queue server 110 in a step 312. The hunt group proxy 150 does so using standard CALL FORWARD ON BUSY commands with the alias assigned to the queue server 110. The gateway 106 then forwards the call (see step 5 in FIG. 5) to the queue server 110 in a step 314. The configured queue server 110 receives the forwarded call in a step 316. In a step 318, queue server 110 reads the alias and forwards the call to the appropriate queue in a step 320. Finally, in a step 322, in the embodiment illustrated, the queue server 110 activates the timer 206. As noted above, the timer 206 is used by the queue server 110 to determine a time at which it should attempt to query the hunt group proxy 150 to determine whether it is available.

Figure 7:
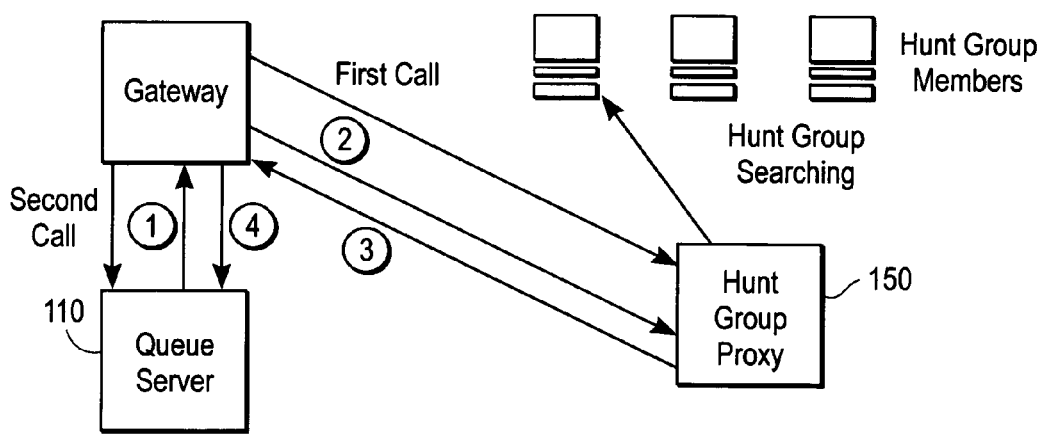
FIG. 7 is a diagram illustrating process flow according to an embodiment of the invention.
Figure 6:
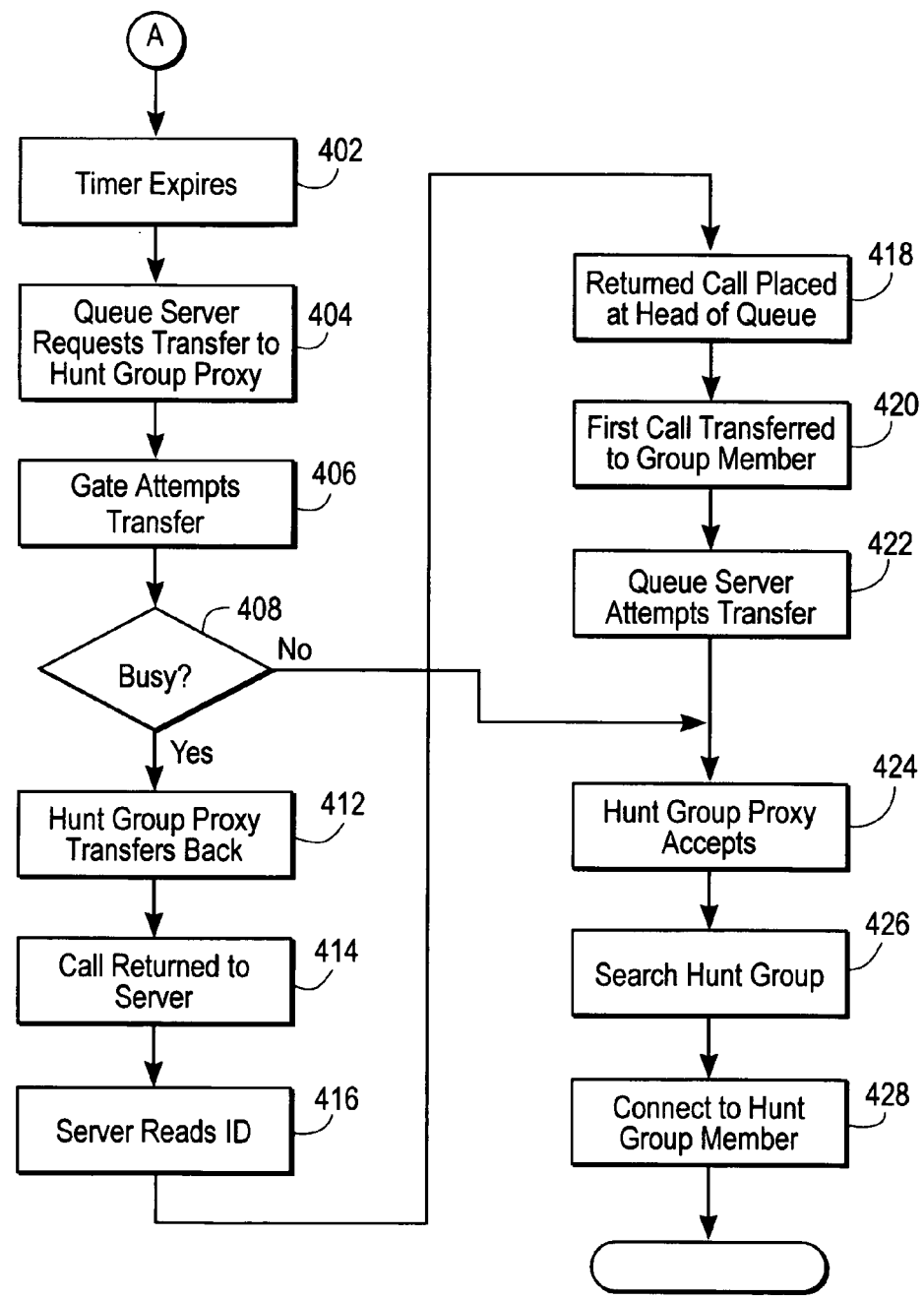
FIG. 6 is a flowchart of a method according to an embodiment of the invention.
Figure 8:
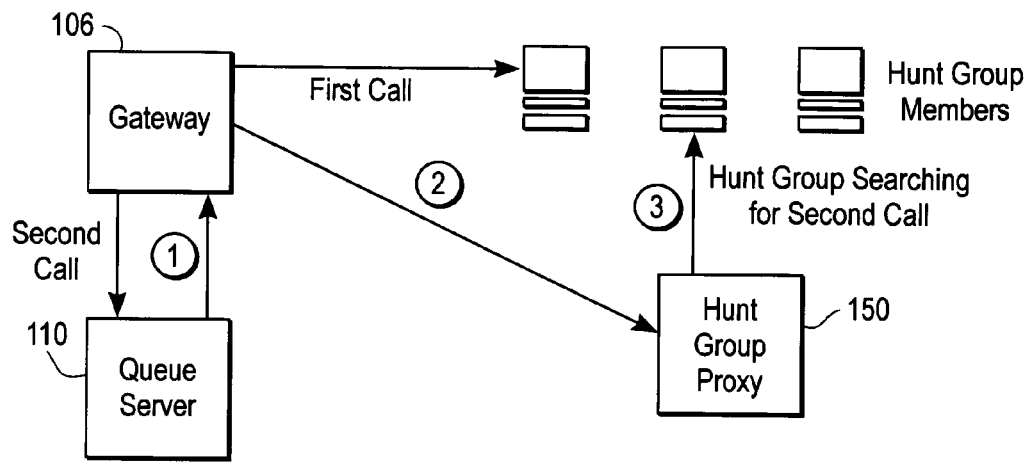
FIG. 8 is a diagram illustrating process flow according to an embodiment of the invention.

The completion of the process in this example is illustrated with respect to FIGS. 6–8. In particular, in a step 402, the timer 206 expires. Next, in a step 404, the queue server 110 requests (see step 1 in FIG. 7) the gateway 106 to transfer the second call to the hunt group proxy 150. The gateway 106 then, in a step 406, attempts the transfer (see step 2 in FIG. 7) in a standard H.323 compliant manner. In a step 408, the hunt group proxy 150 determines whether or not it is busy. If it is in fact busy, then in a step 412, the hunt group proxy 150 transfers the call (see step 3 in FIG. 7) back to the gateway 106. The call is then returned (see step 4 in FIG. 7) to the queue server in a step 414. In doing so, the queue server 110 reads an identification of the returned call, e.g., the global call ID, in a step 416. In a step 418, the returned call is placed at the head of the queue (according to priority, in case multiple calls are queued) in the queue server, in a step 418. It is noted that while a single timer 206 is illustrated with regard to a plurality of queues 111*a*–111*c*, separate timers may be provided for each queue and, indeed, multiple timers may be provided for each queue. Next, in a step 420, the hunt group proxy 150 finds an open hunt group member and transfers the first call to the group member (see FIG. 9). In a step 422, the queue server 110 attempts another connection (see step 1 in FIG. 9), as the timer has expired once more. In a step 424, the hunt group proxy 150 accepts the second call (see step 2 in FIG. 9) and in a step 426 begins (see step 3 in FIG. 9) searching the hunt group for an available hunt group member. Finally, in a step 428, the hunt group proxy 150 connects the call to a hunt group member. If, back in step 408, the hunt group proxy 150 had in fact been available, the call would have been completed to the hunt group at step 424.

Figure 10:
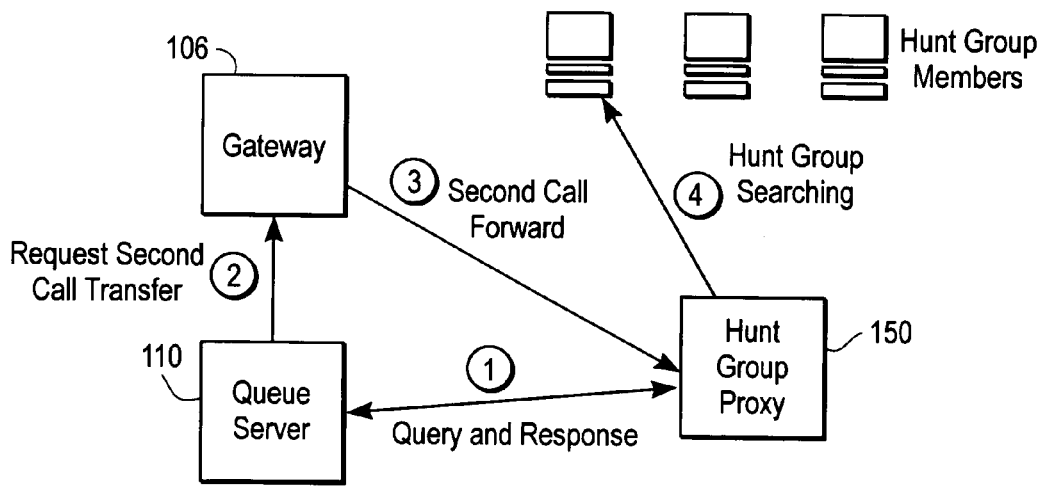
FIG. 10 is a diagram illustrating process flow according to an embodiment of the invention.
Figure 9:
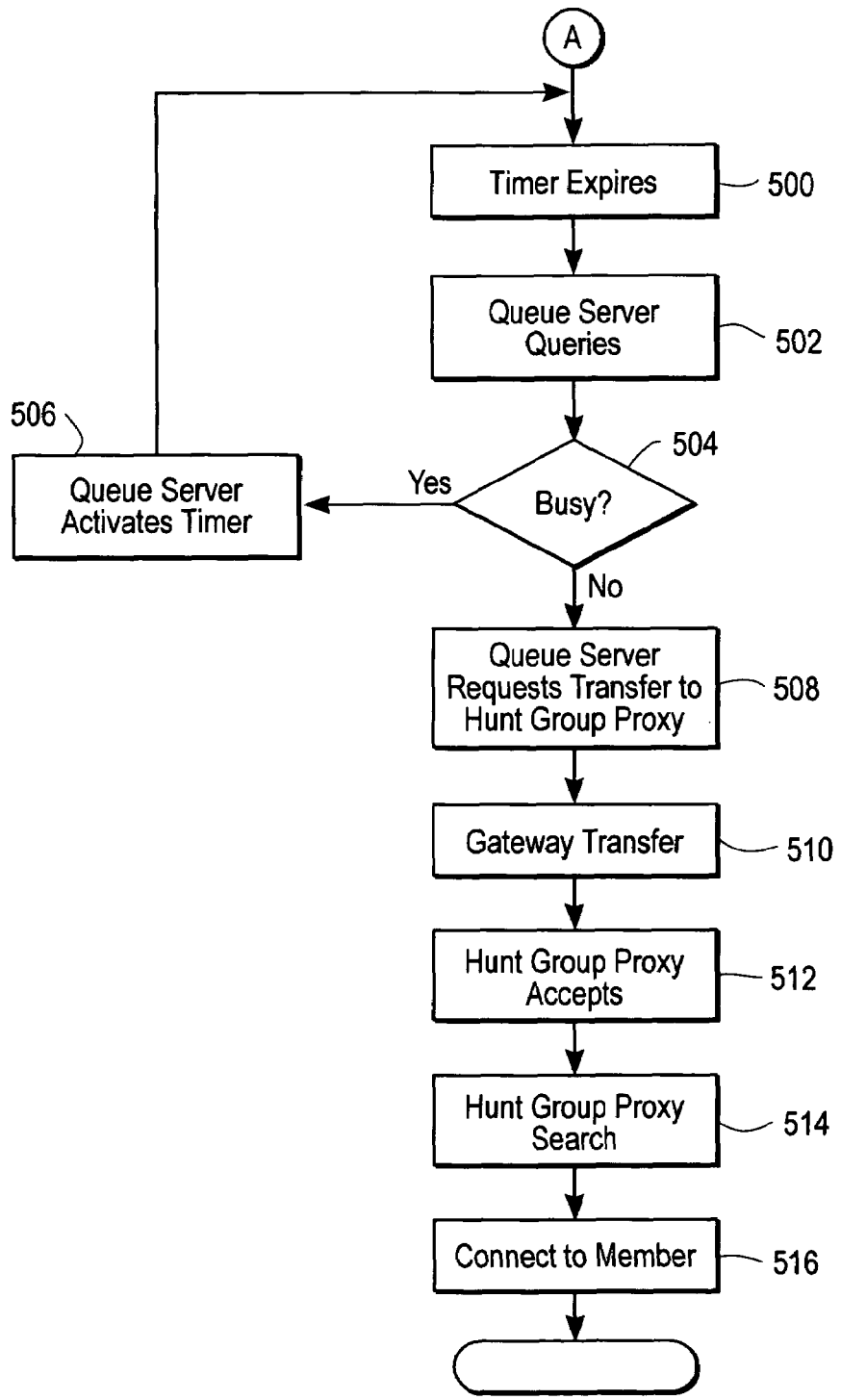
FIG. 9 is a flowchart illustrating process flow according to an embodiment of the invention.

Implementation of a callable queue in accordance with a second embodiment of the invention is described with regard to FIGS. 9 and 10. In particular, as will be described in FIGS. 9 and 10, the H.323 terminal in question (i.e., a hunt group proxy 150) employs H.450 signaling, for example, to support supplementary services to identify the state of the destinations configured to receive the calls from the queue. When the queue server 110 determines that one of the destinations is free (i.e., it receives notification), queue server 110 removes a call from the appropriate queue and transfers the call to the destination. More particularly, first and second calls arrive as described above with regard to FIG. 4, the second call being held in a queue. Then, in a step 500 (FIG. 9), a timer expires. In step 502, the queue server 110 queries (see step 1 in FIG. 10) the hunt group proxy 150 to determine its state. In a step 504, the queue server 110 determines (see also step 1 in FIG. 10) whether the hunt group proxy 150 is free. If the hunt group proxy 150 is not free, then in a step 506, the queue server 110 reactivates the timer and returns to step 500. However, if the queue server 110 establishes that the hunt group proxy 150 is free, the queue server 110 requests (see step 2 in FIG. 10) a transfer, in a step 508. In a step 510, the gateway transfers the call (see step 3 in FIG. 10) to the hunt group proxy 150. In a step 512, the hunt group proxy 150 accepts the call and searches (see step 4 in FIG. 10) the hunt group in step 514. Finally, the hunt group proxy 150 connects the call to the appropriate hunt group member in a step 516.

What is claimed is:

1. A telecommunications system, comprising:
   a packet switching network;
   one or more telephony devices couples to said packet switched network; and
   a queues server implement one or more queues, coupled to said packet switched network, said one or more queues configured with network aliases and to receive forwarded calls from said one or more telephony devices responsive to a request from said one or more telephony devices and and to forward said calls back to said one or more telephony devices when one or more predetermined conditions have been met;
   wherein said one or more queues define callable network entities that may receive calls from other network devices from said one or more telephony devices to forward said calls thereto; and
   wherein said one or more telephony devices define client endpoints adapted to forward said calls to said one or more queues;
   wherein queuing to said one or more queues is implemented as a network callable function;
   wherein said telephony device is a hunt group proxy and said hunt group proxy process the first call by searching for an available hunt group member.

2. The telecommunications system in accordance with claim 1, said packet switched network being H.323 compliant.

3. The telecommunications system in accordance with claim 2, said one or more queues including one or more timers for determining a predetermined delay during which time said calls are stored in said one or more queues prior to forwarding back to said one or more telephony devices.

4. The telecommunications system in accordance with claim 1, said one or more telephony devices configured to be able to request that said one or more calls be forwarded back to them.

5. The telecommunications system in accordance with claim 2, said one or more queues being defined as one or more H.323 callable entities.

6. The telecommunications system in accordance with claim 5, said one or more queues having one or more callable aliases.

7. A method for processing calls in a telecommunication system, said method comprising:
   receiving a first call at a telephony device on a network;
   receiving a second call at said telephony device while said first call is being processed;
   transferring said second call to a queue configured with a network alias responsive to a request by said telephony device, said queue being definable as a callable network device that may receive calls from other network devices on said network; and
   transferring said second call back to said telephony device after a predetermined condition is met;
   wherein said telephony device comprises a client endpoint and is adapted to request a call transfer to said queue;
   wherein queuing to said queue is implemented as a network callable function;
   wherein said telephony device is a hunt group proxy and said hunt group proxy process the first call by searching for an available hunt group member.

8. The method according to claim 7, said predetermined condition being expiration of a timer.

9. The method according to claim 7, said predetermined condition being notification that said telephony device has completed processing of said first call.

10. The method according to claim 7, wherein said telephony device is H.323 complaint.

11. The method according to claim 7, wherein said network is H.323 complaint.

12. A system for processing calls in a telecommunications network, comprising:
   one or more first callable network entities coupled to said telecommunications network; and
   one or more second callable network entities that may receive calls from other network devices coupled to said telecommunications network, wherein said one or more second callable network entities are defined as queues configured with network aliases for temporary holding of calls for said one or more first callable network entities while said one or more first callable network entities are processing other calls responsive to a request from said one or more first callable network entities, wherein said one or more first callable network entities are configured to forward said calls to said one or more second callable network entities while said one or more first callable network entities are busy;
   wherein queuing to said queue is implemented as a network callable function;
   wherein said callable network entity is a hunt group proxy and said hunt group proxy process the first call by searching for an available hunt group member.

13. The system according to claim 12, wherein said one or more first and second callable entities are H.323 compliant.

14. A system for processing calls in a telecommunications network, comprising;
   one or more first callable entities coupled to said telecommunications network: and
   one or more second callable entities that may receive calls from other network devices coupled to said telecommunications network, wherein said one or more second callable entities are defined as queues configured with network aliases for temporary holding of calls for said one or more first callable entities while said one or more first callable entities are processing other calls;
   wherein said one or more first and second callable entities are H.323 compliant: and
   wherein said one or more first callable entities are configured to request a forward of said calls to said one or more second callable entities while said one or more first callable entities are busy;
   wherein queuing to said queue is implemented as a network callable function;
   wherein said callable network entity is a hunt group proxy and said hunt group proxy process the first call by searching for an available hunt group member.

15. The system according to claim 14, wherein said one or more second callable entities are configured to forward said calls back to said one or more first callable entities after a predetermined period has elapsed.

16. The system according to claim 14, wherein said one or more first callable entities are configured to request said second callable entities transfer queued calls back when said one or more first callable entities are available.

17. The system according to claim 14, wherein said network is H.323 compliant.

* * * * *